US012801220B2

(12) United States Patent
Hsieh et al.

(10) Patent No.: US 12,801,220 B2
(45) Date of Patent: Nov. 17, 2026

(54) TACTILE RENDERING SYSTEM AND TACTILE RENDERING METHOD

(71) Applicant: INDUSTRIAL TECHNOLOGY RESEARCH INSTITUTE, Hsinchu (TW)

(72) Inventors: Wan-Hsin Hsieh, Taoyuan City (TW); Hung-Hsien Ko, Zhubei City (TW); Yun-Yi Huang, Hsinchu City (TW); Heng-Yin Chen, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/812,544

(22) Filed: Aug. 22, 2024

(65) Prior Publication Data

US 2025/0068248 A1 Feb. 27, 2025

Related U.S. Application Data

(60) Provisional application No. 63/534,370, filed on Aug. 24, 2023.

(30) Foreign Application Priority Data

Jul. 30, 2024 (TW) ................................ 113128332

(51) Int. Cl.
*G06F 3/01* (2006.01)
*G06T 7/40* (2017.01)

(52) U.S. Cl.
CPC ............. *G06F 3/016* (2013.01); *G06F 3/011* (2013.01); *G06T 7/40* (2013.01)

(58) Field of Classification Search
CPC ............. G06F 3/016; G06F 3/011; G06T 7/40
See application file for complete search history.

(56) References Cited

U.S. PATENT DOCUMENTS 9,257,022 B2 2/2016 Cruz-Hernandez
10,416,769 B2 9/2019 Ofek et al.
(Continued)

FOREIGN PATENT DOCUMENTS

CN 109154859 A 1/2019
CN 114265503 A 4/2022
(Continued)

OTHER PUBLICATIONS

Cao et al., "A Review of Hashing Methods for Multimodal Retrieval", IEEE Access, 2020, vol. 8, pp. 15377-15391.
(Continued)

*Primary Examiner* — William Lu
(74) *Attorney, Agent, or Firm* — Birch, Stewart, Kolasch & Birch, LLP

(57) ABSTRACT

A tactile rendering system and a tactile rendering method are provided. An image capture module is used to obtain a real material surface image. A texture image processing module is used to obtain a real texture image according to the real material surface image. A texture image feature factor capturing module is used to analyze at least one real texture image feature factor according to the real texture image. A tactile feature database factor search module is used to search a tactile feature database according to the real texture image feature factors to obtain at least one tactile data. A tactile human rendering generation module is used to generate at least one tactile rendering signal according to the tactile data.

20 Claims, 11 Drawing Sheets

(56) References Cited

U.S. PATENT DOCUMENTS

| | | | | |
|---|---|---|---|---|
| 10,477,298 | B2 | 11/2019 | Cruz-Hernandez | |
| 10,692,337 | B2 | 6/2020 | Venkatesen | |
| 10,748,391 | B2 | 8/2020 | Grant et al. | |
| 10,852,827 | B1 * | 12/2020 | Bochereau | G08B 6/00 |
| 11,880,178 | B1 * | 1/2024 | Thomson | G05B 19/0426 |
| 2005/0210019 | A1 * | 9/2005 | Uehara | G06F 16/5838 |
| 2008/0071559 | A1 * | 3/2008 | Arrasvuori | G06F 3/011 705/26.1 |
| 2009/0251421 | A1 * | 10/2009 | Bloebaum | G06F 3/011 345/173 |
| 2010/0231540 | A1 * | 9/2010 | Cruz-Hernandez | G06T 15/04 345/173 |
| 2011/0142335 | A1 * | 6/2011 | Ghanem | G06F 16/5838 382/218 |
| 2013/0181913 | A1 * | 7/2013 | Cole | G06F 3/016 345/173 |
| 2014/0301649 | A1 * | 10/2014 | Zhang | H04N 19/865 382/199 |
| 2015/0175172 | A1 | 6/2015 | Truong | |
| 2015/0268725 | A1 * | 9/2015 | Levesque | G06F 3/041 345/156 |
| 2015/0293592 | A1 * | 10/2015 | Cheong | G06F 1/163 345/173 |
| 2015/0323995 | A1 * | 11/2015 | Lim | G06F 3/016 345/174 |
| 2015/0379676 | A1 * | 12/2015 | Girado | G06T 7/40 345/501 |
| 2016/0189427 | A1 * | 6/2016 | Wu | G06F 3/011 345/633 |
| 2016/0217590 | A1 * | 7/2016 | Mullins | G06T 7/40 |
| 2016/0314335 | A1 * | 10/2016 | Al-Kofahi | G06T 7/187 |
| 2017/0039737 | A1 * | 2/2017 | Madabhushi | A61B 6/5217 |
| 2017/0160814 | A1 * | 6/2017 | Du | G06F 3/04883 |
| 2017/0192493 | A1 * | 7/2017 | Ofek | G06F 3/0304 |
| 2017/0220111 | A1 * | 8/2017 | Nakamura | G06F 3/0416 |
| 2018/0276832 | A1 * | 9/2018 | Aikin | H04N 23/56 |
| 2019/0043267 | A1 * | 2/2019 | Anderson | G06F 3/011 |
| 2019/0043322 | A1 * | 2/2019 | Tachi | G06F 3/016 |
| 2019/0132589 | A1 * | 5/2019 | Chida | G06T 7/40 |
| 2019/0156567 | A1 * | 5/2019 | Cao | G06T 7/40 |
| 2019/0171291 | A1 * | 6/2019 | Domenikos | G06F 3/0346 |
| 2020/0218354 | A1 * | 7/2020 | Beattie | G06F 3/011 |
| 2021/0383115 | A1 * | 12/2021 | Alon | A63F 13/77 |
| 2022/0129077 | A1 * | 4/2022 | Hamilton | G06F 3/016 |
| 2022/0253142 | A1 * | 8/2022 | Gustin | G06F 3/014 |
| 2023/0126419 | A1 * | 4/2023 | Niijima | G06F 3/016 340/407.1 |
| 2023/0140550 | A1 | 5/2023 | Furtwangler et al. | |

FOREIGN PATENT DOCUMENTS

| | | | |
|---|---|---|---|
| CN | 115904058 | A | 4/2023 |
| CN | 116363335 | A | 6/2023 |
| CN | 116560492 | A | 8/2023 |
| CN | 116601587 | A | 8/2023 |
| TW | 201342122 | A | 10/2013 |
| TW | I756950 | B | 3/2022 |
| TW | 202341082 | A | 10/2023 |

OTHER PUBLICATIONS

Costes et al., "KinesTouch: 3D Force-Feedback Rendering for Tactile Surfaces", Virtual Reality and Augmented Reality: 15th EuroVRInternational Conference, EuroVR2018, London, UK, Oct. 22-23, 2018, pp. 1-21.

Humeau-Heurtier, "Texture Feature Extraction Methods: A Survey", IEEE access, 2019, vol. 7, pp. 8975-9000.

Manjunath et al., "Texture Features for Browsing and Retrieval of Image Data", IEEE Transactions on pattern analysis and machine intelligence, Aug. 1996, vol. 18, No. 8, pp. 837-842.

Muender et al., "Haptic Fidelity Framework: Defining the Factors of Realistic Haptic Feedback for Virtual Reality", 2022, pp. 1-17.

Shin et al., "Hybrid Framework for Haptic Texture Modeling and Rendering", IEEE Access, 2020, vol. 8, pp. 149825-149840.

Steinbach et al., "Haptic Codecs for the Tactile Internet", Proceeding of the IEEE, Feb. 2019, vol. 107, No. 2, pp. 447-470.

Yem et al., "Wearable Tactile Device using Mechanical and Electrical Stimulation for Fingertip Interaction with Virtual World", IEEE Xplore, 2024, pp. 99-104.

Taiwanese Office Action and Search Report for Taiwanese Application No. 113128332, dated Mar. 21, 2025.

* cited by examiner

TACTILE RENDERING SYSTEM AND TACTILE RENDERING METHOD

This application claims the benefit of U.S. Provisional application Ser. No. 63/534,370, filed Aug. 24, 2023, and Taiwan application Serial No. 113128332, filed Jul. 30, 2024, the disclosure of which is incorporated by reference herein in its entirety.

TECHNICAL FIELD

The disclosure relates to a tactile rendering system and a tactile rendering method.

BACKGROUND

With the rapid development of science and technology, various interactive technologies have been developed. For example, interactive display technology could be applied to various fields such as education, gaming, sports, and automobiles. As the current interactive display technology provides merely visual feedback, when users adopt interactive modalities such as gestures, stylus pens, and hand-held joysticks, there is no realistic tactile feedback, which greatly reduces the user experience.

SUMMARY

The disclosure is directed to a tactile rendering system and a tactile rendering method, which apply a texture imaging procedure to the comparison of the generative texture image, apply a tactile rendering procedure to the generation of a tactile rendering signal, and control the tactile feedback module for realistic tactile sensation.

According to one embodiment, a tactile rendering system is provided. The tactile rendering system includes a texture image processing subsystem, a generative texture image comparison subsystem and a tactile rendering subsystem. The texture image processing subsystem includes an image capture module and a texture image processing module. The image capture module is used to obtain a real material surface image. The texture image processing module is used to obtain a real texture image according to the real material surface image. The generative texture image comparison subsystem includes a texture image feature factor capturing module, a tactile feature database and a tactile feature database factor search module. The texture image feature factor capturing module is used to analyze at least one real texture image feature factor according to the real texture image. The tactile feature database factor search module is used to search the tactile feature database to obtain at least one tactile data according to the at least one real texture image feature factor. The tactile rendering subsystem includes a tactile human rendering generation module. The tactile human rendering generation module is used to generate at least one tactile rendering signal according to the at least one tactile data.

According to another embodiment, a tactile rendering method is provided. The tactile rendering method includes obtaining a real material surface image; obtaining a real texture image according to the real material surface image; obtaining at least one real texture image feature factor according to the real texture image; searching a tactile feature database according to the at least one real texture image feature factor, to obtain at least one tactile data; and generating at least one tactile rendering signal according to the at least one tactile data.

Figure 1:
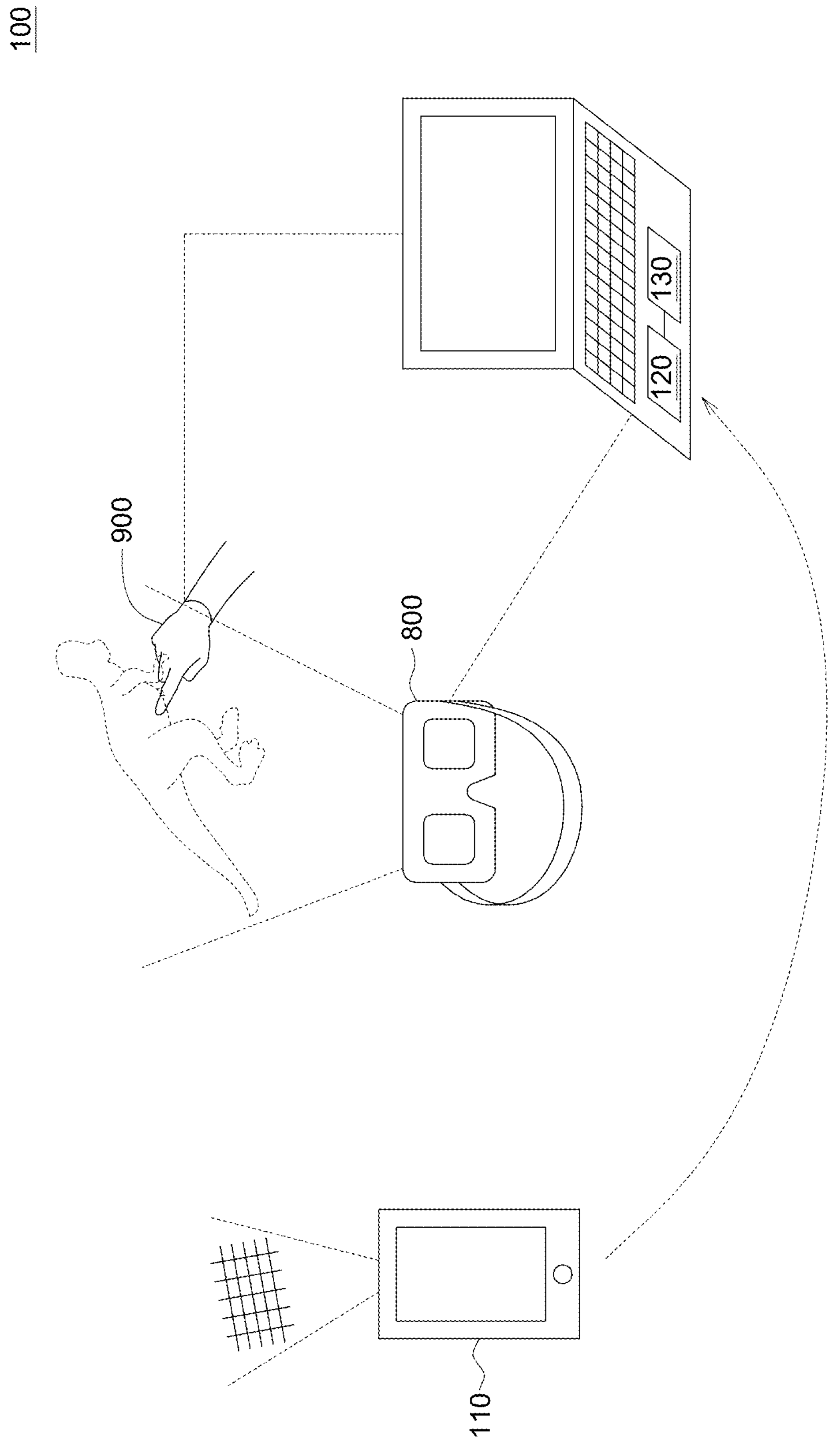
FIG. 1 illustrates an application scenario of a tactile rendering system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates an application scenario of a tactile rendering system 100 according to an embodiment of the present disclosure. The tactile rendering system 100 includes, for example, a texture image processing subsystem 110, a generative texture image comparison subsystem 120 and a tactile rendering subsystem 130. The texture image processing subsystem 110 is used to obtain the actual texture image, such as a smartphone with a lens, a head-mounted device, a camera, or an image storage device. The generative texture image comparison subsystem 120 is used for texture image processing, and the tactile rendering subsystem 130 is used for tactile rendering. The generative texture image comparison subsystem 120 and/or the tactile rendering subsystem 130 is, for example, installed on a laptop computer, a desktop computer, a server, a smartphone, a head-mounted device or a tablet computer. The texture image processing subsystem 110, the generating texture image comparison subsystem 120 and the tactile rendering subsystem 130 could be installed on the same device or different devices.

In an application scenario, the user could wear a virtual display 800 (such as, but not limited to, a head-mounted display or VR glasses), or a flat-panel display to view a virtual object. The virtual object is displayed in front of the user. The user could interact with the virtual object while wearing the tactile feedback module 900 (such as, but not limited to, a glove that actuates a vibration device and an air bag). Once the tactile feedback module 900 moves to the position of the virtual object, the corresponding tactile sensation would be generated according to the texture of the virtual object. In this way, users could obtain a realistic tactile experience when he or she is interacting with the virtual object.

Figure 2:
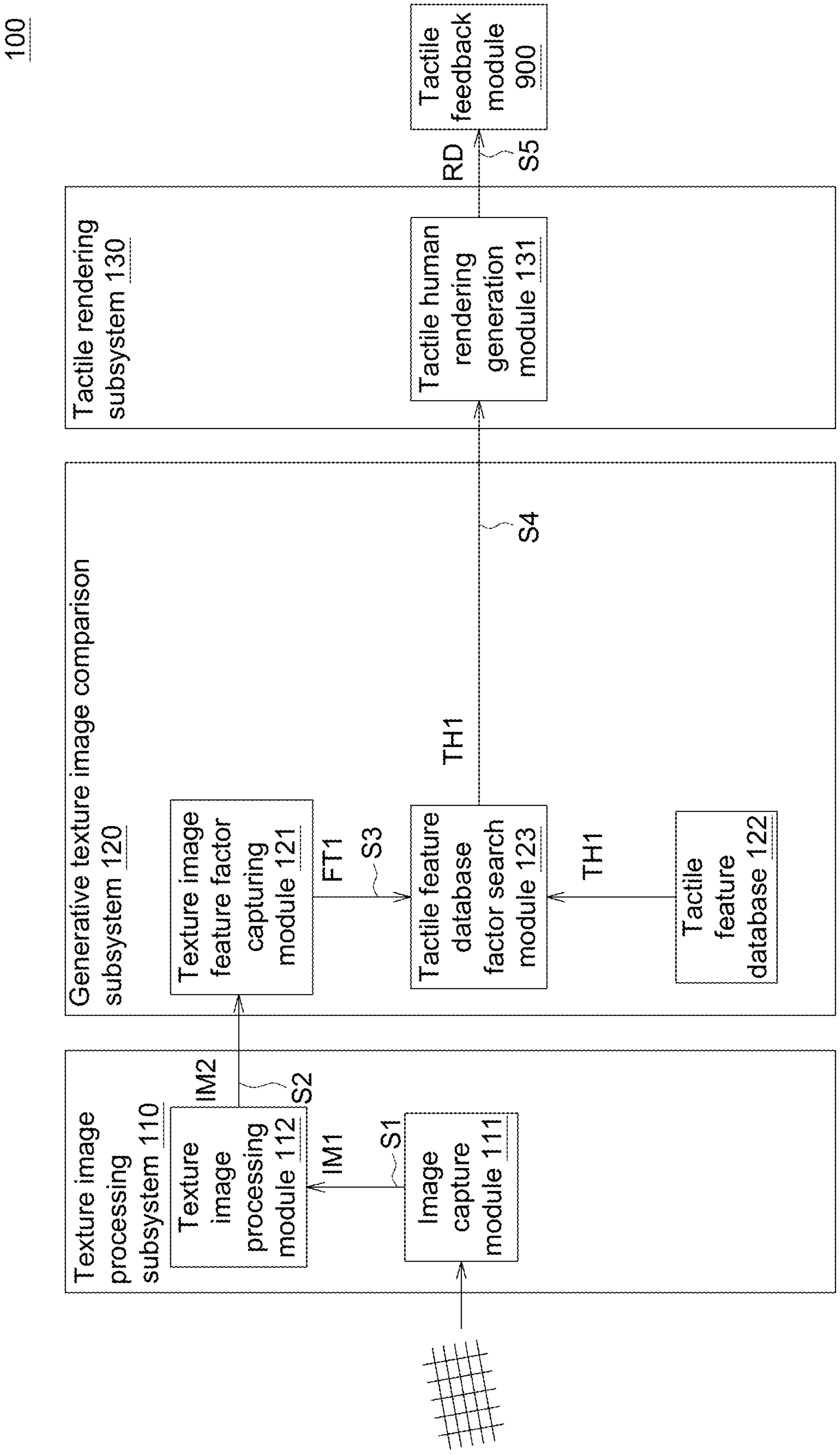
FIG. 2 illustrates a block diagram of the tactile rendering system and a flowchart of a tactile rendering method according to an embodiment of the present disclosure.

Please refer to FIG. 2, which illustrates a block diagram of the tactile rendering system 100 and a flowchart of the tactile rendering method according to an embodiment of the present disclosure. The tactile rendering system 100 includes the texture image processing subsystem 110, the generative texture image comparison subsystem 120 and the tactile rendering subsystem 130. The texture image processing subsystem 110 includes an image capture module 111 and a texture image processing module 112. The texture image processing module 112 is, for example, but not limited to, a circuit, a circuit board, a storage device that stores program code, or a chip. The image capture module 111 is, for example, but not limited to, a lens or a camera.

In step S1, the image capture module 111 obtains a real material surface image IM1 and digitizes the image. The real material surface image IM1 is, for example, but not limited to, surface images of leather, rubber, cotton, metal, glass and other materials.

In step S2, the texture image processing module 112 obtains a real texture image IM2 according to the real material surface image IM1. The texture image processing module 112 obtains a texture information according to, for example, but not limited to, color changes or grayscale changes on the real material surface image IM1 and obtain the real texture image IM2 accordingly.

The generative texture image comparison subsystem 120 includes a texture image feature factor capturing module 121, a tactile feature database 122 and a tactile feature database factor search module 123. The texture image feature factor capturing module 121 and/or the tactile feature database factor search module 123 is, for example, but not limited to, a circuit, a circuit board, a storage device storing program code, or a chip. The tactile feature database 122 is, for example, but not limited to, any type of fixed or removable random access memory (RAM), read-only memory (ROM), flash memory, hard disk drive (HDD), solid state drive (SSD) or similar component or a combination of the above components.

In step S3, the texture image feature factor capturing module 121 obtains at least one real texture image feature factor FT1 according to the real texture image IM2. The real texture image feature factor FT1 is, for example, but not limited to, shape, area, gradient of shape, period of spatial variation of a rough surface, depth of spatial variation, etc. The texture image feature factor capturing module 121 could also determine whether the degree of changes meet the threshold, where these values and evaluated results could be used as the real texture image feature factor FT1.

In step S4, the tactile feature database factor search module 123 searches the tactile feature database 122 according to the real texture image feature factor FT1 to obtain at least one tactile data TH1. The tactile data TH1 is, for example, but is not limited to surface fluctuations, roughness changes and other information. The tactile data TH1 could be a quantification result of surface topography, such as local gradient, period of roughness variation, height of roughness change, etc.; or a quantification result of image pattern, such as gray-scale co-occurrence matrix energy value, entropy value, contrast value, contrast difference value, correlation value, etc.; or the curve of shape change after signal processing, such as principal components or intrinsic mode function, etc. The tactile feature database 122 stores multiple sets of tactile data TH1. According to the similarity between each set of the tactile data TH1 and the real texture image feature factor FT1, the tactile feature database factor search module 123 first select the one with the highest similarity.

The tactile rendering subsystem 130 includes a tactile human rendering generation module 131. The tactile human rendering generation module 131 is, for example, but not limited to, a circuit, a circuit board, a storage device storing program code, or a chip.

In step S5, the tactile human rendering generation module 131 generates at least one tactile rendering signal RD according to the tactile data TH1. The tactile rendering signal RD is, for example, but is not limited to, information such as surface fluctuation waveforms that change over time, change of roughness, or change of friction. With the tactile rendering signal RD, the tactile feedback module 900 could be controlled accordingly to produce a realistic tactile feeling.

Figure 3:
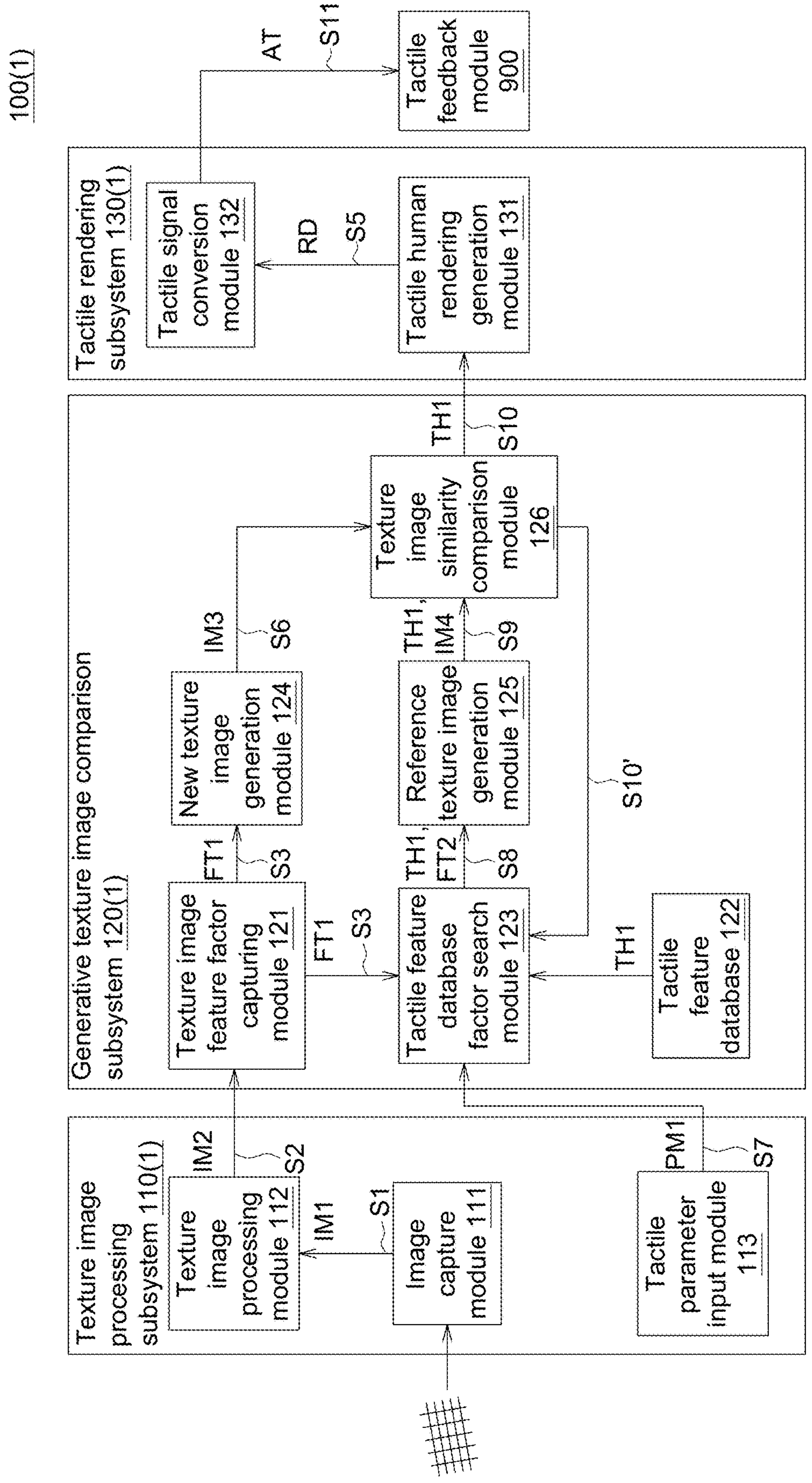
FIG. 3 illustrates a block diagram of a tactile rendering system and a flowchart of a tactile rendering method according to another embodiment of the present disclosure.

Please refer to FIG. 3, which illustrates a block diagram of a tactile rendering system 100(1) and a flowchart of a tactile rendering method according to another embodiment of the present disclosure. The tactile rendering system 100(1) in FIG. 3 includes a texture image processing subsystem 110(1), a generative texture image comparison subsystem 120(1) and a tactile rendering subsystem 130(1). The texture image processing subsystem 110(1) further includes a tactile parameter input module 113. The generative texture image comparison subsystem 120(1) further includes a new texture image generation module 124, a reference texture image generation module 125 and a texture image similarity comparison module 126. The tactile rendering subsystem 130(1) further includes a tactile signal conversion module 132. The tactile parameter input module 113, the new texture image generation module 124, the reference texture image generation module 125, the texture image similarity comparison module 126 and/or the tactile signal conversion module 132 is, for example, but not limited to, a circuit, a circuit board, a storage device which stores program code or a chip.

In step S6, the new texture image generation module 124 generates a new texture image IM3 according to the real texture image feature factor FT1. The new texture image IM3 is, for example, different from the real texture image IM2. Alternatively, the new texture image IM3 may be the same as the real texture image IM2. The new texture image IM3 may be only generated according to the real texture image feature factor FT1, so it is not necessary to reflect unnecessary information.

In step S7, the tactile parameter input module 113 inputs at least one material surface property parameter PM1. The material surface property parameter PM1 is, for example, but not limited to, friction coefficient, hardness, temperature and other parameters.

In step S8, the tactile feature database factor search module 123 obtains at least one reference texture image feature factor FT2 according to the material surface property parameter PM1 and the real texture image feature factor FT1. The reference texture image feature factor FT2 is, for example, but not limited to, shape, area, gradient of shape, period of spatial variation of a rough surface, depth of spatial variation, etc. The tactile feature database 122 stores multiple sets of tactile data TH1 and the corresponding reference texture image feature factor FT2. According to the similarity between each set of tactile data TH1 and the real texture image feature factor FT1, the tactile feature database factor search module 123 first select the reference texture image feature factor FT2 corresponding to the highest similarity.

In step S9, the reference texture image generation module 125 generates a reference texture image IM4 according to the reference texture image feature factor FT2.

In step S10, the texture image similarity comparison module 126 compares the new texture image IM3 and the reference texture image IM4. If the similarity between the new texture image IM3 and the reference texture image IM4 is greater than a predetermined value (for example, but not limited to, 90%) or the time has passed a predetermined time (for example, but not limited to, 30 ms), then the tactile data TH1 corresponding the reference texture image feature factor FT2 is outputted. On the contrary, if the similarity between the new texture image IM3 and the reference texture image IM4 is not greater than the predetermined value and the time has not reached the predetermined time, then in step S10', the tactile feature database factor search module 123 is asked to repeat the step S8 to search the next set of reference texture image feature factor FT2. If the search cannot be completed within the predetermined time (such as, but not limited to, 30 ms), the tactile data TH1 with the highest similarity in the previous time is inputted in the step S10.

As shown in FIG. 3, after obtaining the tactile rendering signal RD in the step S5, in step S11, the tactile signal conversion module 132 converts the tactile rendering signal RD into at least one actuation signal AT.

The quantity of the actuation signals AT could be plurality. The actuation signals AT are, for example, vibration control signals, inflation control signals, compression control signals, voltage control signals, temperature control signals, etc. In one embodiment, the actuation signals AT could control the tactile feedback modules 900 in a time-divided multiple access manner, in a frequency-divided multiple access manner or in a code-divided multiple access manner. That is to say, different actuation signals AT are activated in turn.

In another embodiment, the actuation signals AT could control at least one tactile feedback module 900 in a spatial separation manner. That is to say, the actuation signals AT could be activated at different locations at the same time.

According to the above embodiment in FIG. 3, through the comparison between the new texture image IM3 and the reference texture image IM4, the appropriate tactile data TH1 could be accurately obtained, making the simulated tactile sensation generated by the activation signals AT more realistic.

Figure 4:
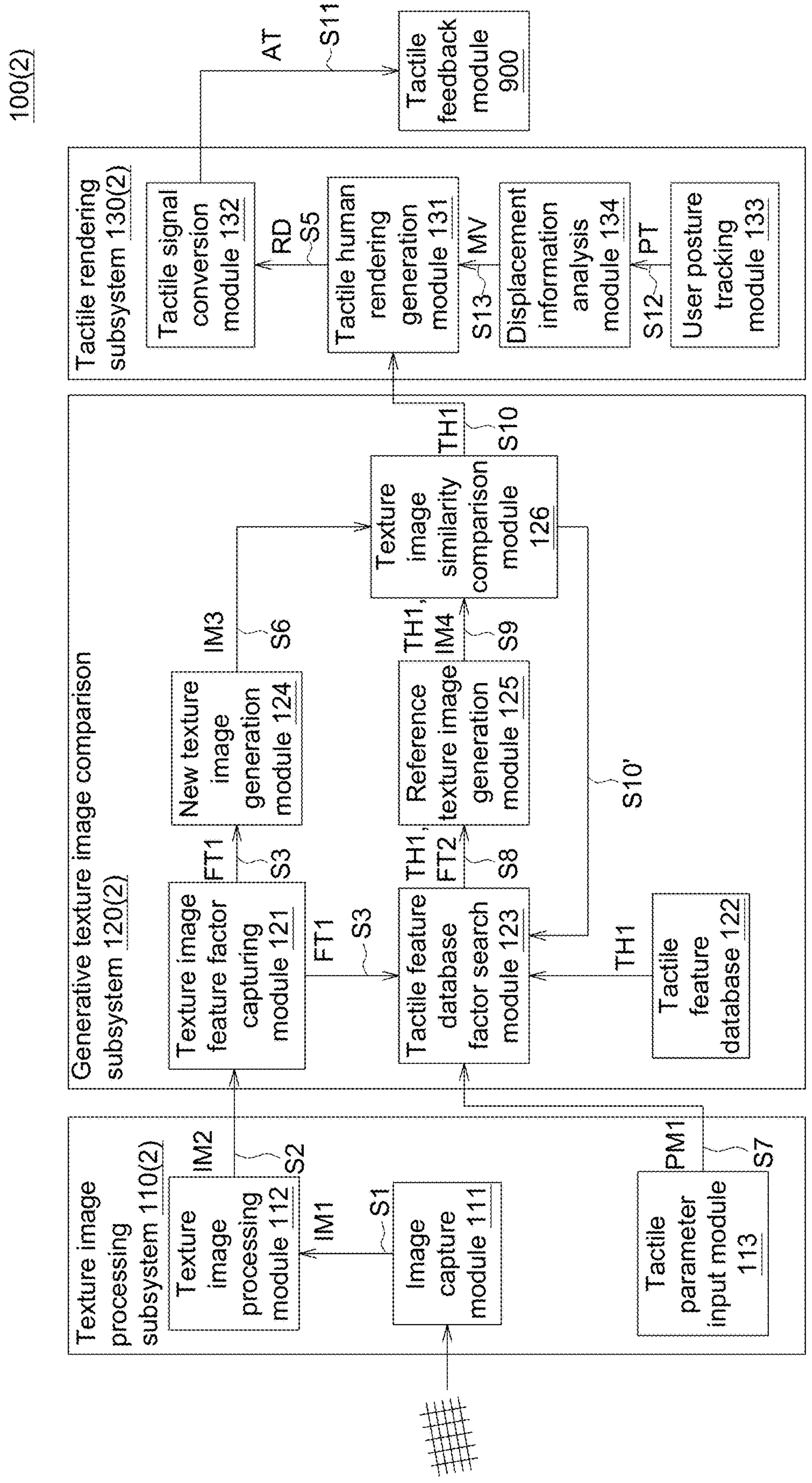
FIG. 4 illustrates a block diagram of a tactile rendering system and a flowchart of a tactile rendering method according to another embodiment of the present disclosure.

Please refer to FIG. 4, which illustrates a block diagram of a tactile rendering system 100(2) and a flowchart of a tactile rendering method according to another embodiment of the present disclosure. The tactile rendering system 100(2) in FIG. 3 includes a texture image processing subsystem 110(2), a generative texture image comparison subsystem 120(2) and a tactile rendering subsystem 130(2). The tactile rendering subsystem 130(2) further includes a user posture tracking module 133 and a displacement information analysis module 134. The user posture tracking module 133 and/or the displacement information analysis module 134 is, for example, but not limited to, a circuit, a circuit board, a storage device storing program code, or a chip.

In step S12, the user posture tracking module 133 obtains a user posture PT (such as, but not limited to, the direction, speed, acceleration and other data of the user's hand).

In step S13, the displacement information analysis module 134 obtains a displacement information MV according to the user posture PT.

In step S5, the tactile human rendering generation module 131 could generate the tactile rendering signal RD according to the displacement information MV.

According to the embodiment of FIG. 4 above, the user posture PT is further considered, so that the tactile rendering signal RD could be optimized, making the simulated tactile sensation generated by the actuation signals AT more realistic.

Figure 5:
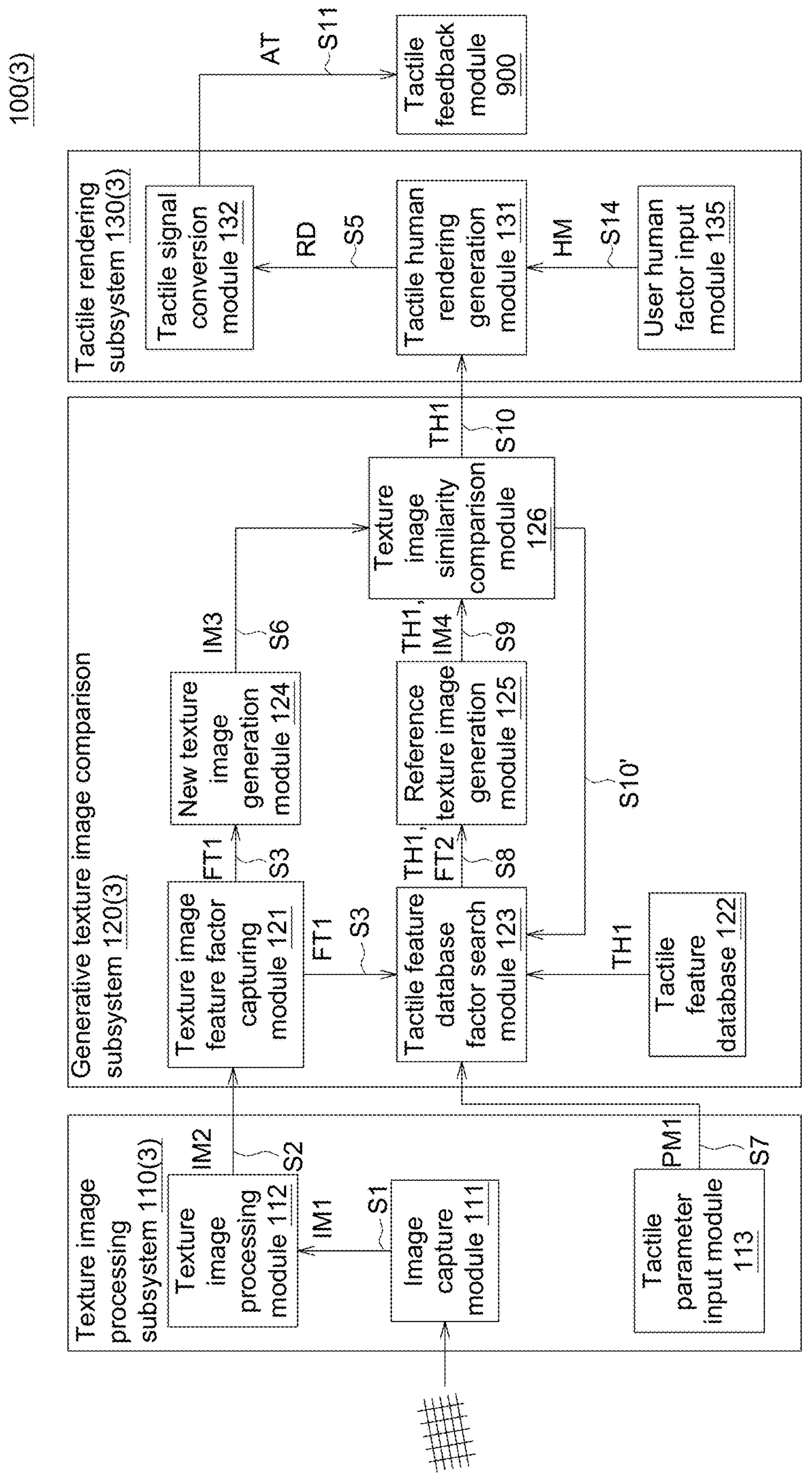
FIG. 5 illustrates a block diagram of a tactile rendering system and a flowchart of a tactile rendering method according to another embodiment of the present disclosure.

Please refer to FIG. 5, which illustrates a block diagram of a tactile rendering system 100(3) and a flowchart of a tactile rendering method according to another embodiment of the present disclosure. The tactile rendering system 100(3) in FIG. 5 includes a texture image processing subsystem 110(3), a generative texture image comparison subsystem 120(3) and a tactile rendering subsystem 130(3). The tactile rendering subsystem 130(3) further includes a user human factor input module 135. The user human factor input module 135 is, for example, but not limited to, a circuit, a circuit board, a storage device storing program code, or a chip.

In step S14, the user human factor input module 135 inputs a user human factor HM. The user human factor HM is, for example, but not limited to, the user's just-noticeable difference (JND), age, gender, skin condition, etc.

In step S5, the tactile human rendering generation module 131 could optimize the tactile rendering signal RD according to the user human factor HM.

According to the embodiment in FIG. 5 above, the user human factor HM is further considered, so that the tactile rendering signal RD could be optimized, making the simulated tactile sensation generated by the actuation signals AT more realistic.

Figure 6:
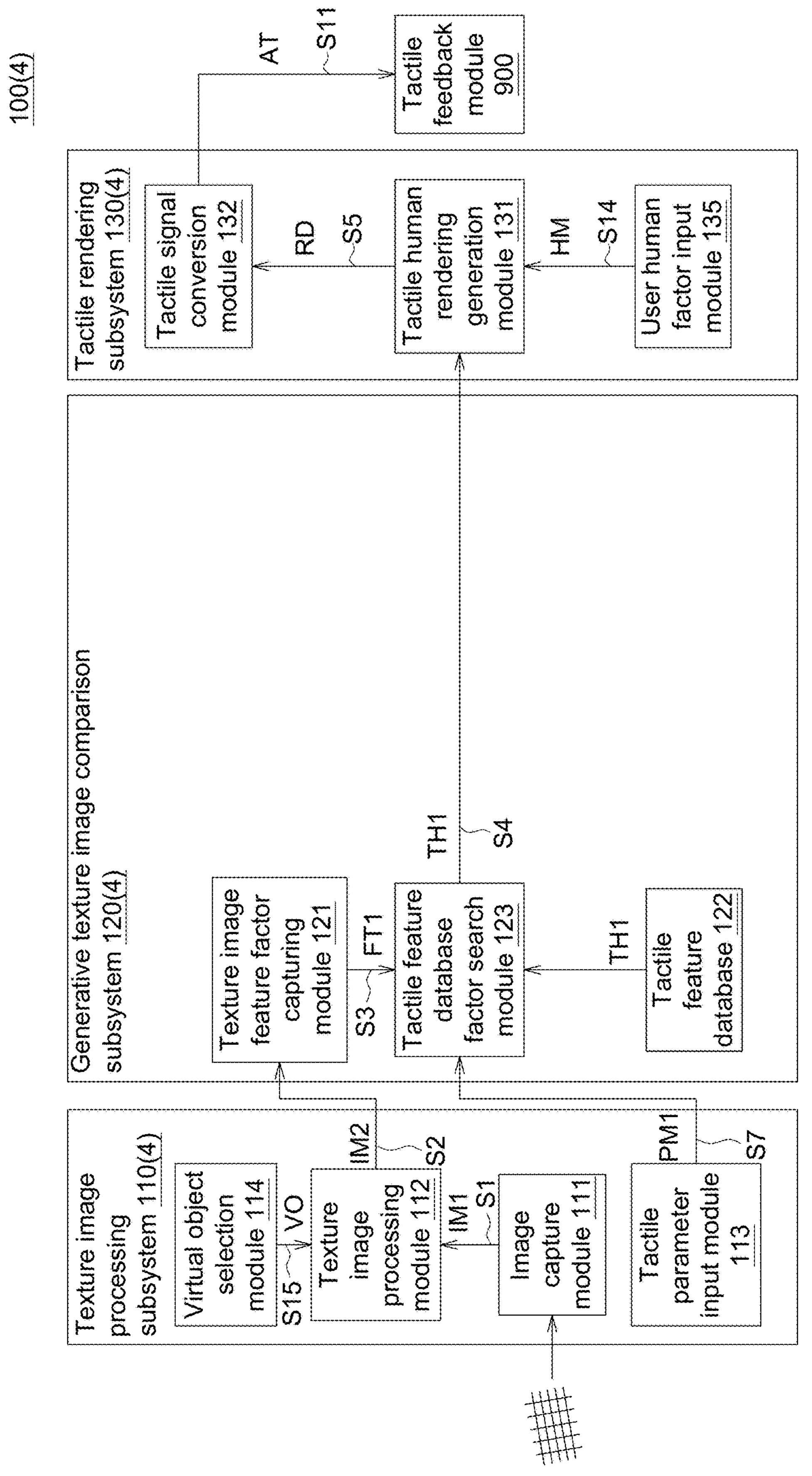
FIG. 6 illustrates a block diagram of a tactile rendering system and a flowchart of a tactile rendering method according to another embodiment of the present disclosure.

Please refer to FIG. 6, which illustrates a block diagram of a tactile rendering system 100(4) and a flowchart of a tactile rendering method according to another embodiment of the present disclosure. The tactile rendering system 100(4) in FIG. 6 includes a texture image processing subsystem 110(4), a generative texture image comparison subsystem 120(4) and a tactile rendering subsystem 130(4). The texture image processing subsystem 110(4) further includes a virtual object selection module 114. The virtual object selection module 114 is, for example, but not limited to, a circuit, a circuit board, a storage device that stores program code, or a chip.

In step S15, the virtual object selection module 114 provides at least one virtual object VO. The virtual object VO is, for example, but not limited to, the virtual display 800 (shown in FIG. 1), a virtual object displayed in front of the user.

In step S2, the texture image processing module 112 could obtain the real texture image IM2 according to the real material surface image IM1 and the virtual object VO. The virtual object VO is further considered, so the accuracy of the real texture image IM2 could be improved, and the comparison of the new texture image IM3 and the reference texture image IM4 could be skipped. When the deviation of image feature is less than the threshold (for example, it is, but not limited to, 10%), the tactile data TH1 could be identified by the real texture image feature factor FT1.

According to the above embodiment in FIG. 6, the user human factor HM is further considered, so that the comparison process is simplified, and the rendering speed is speeded up.

Figure 7:
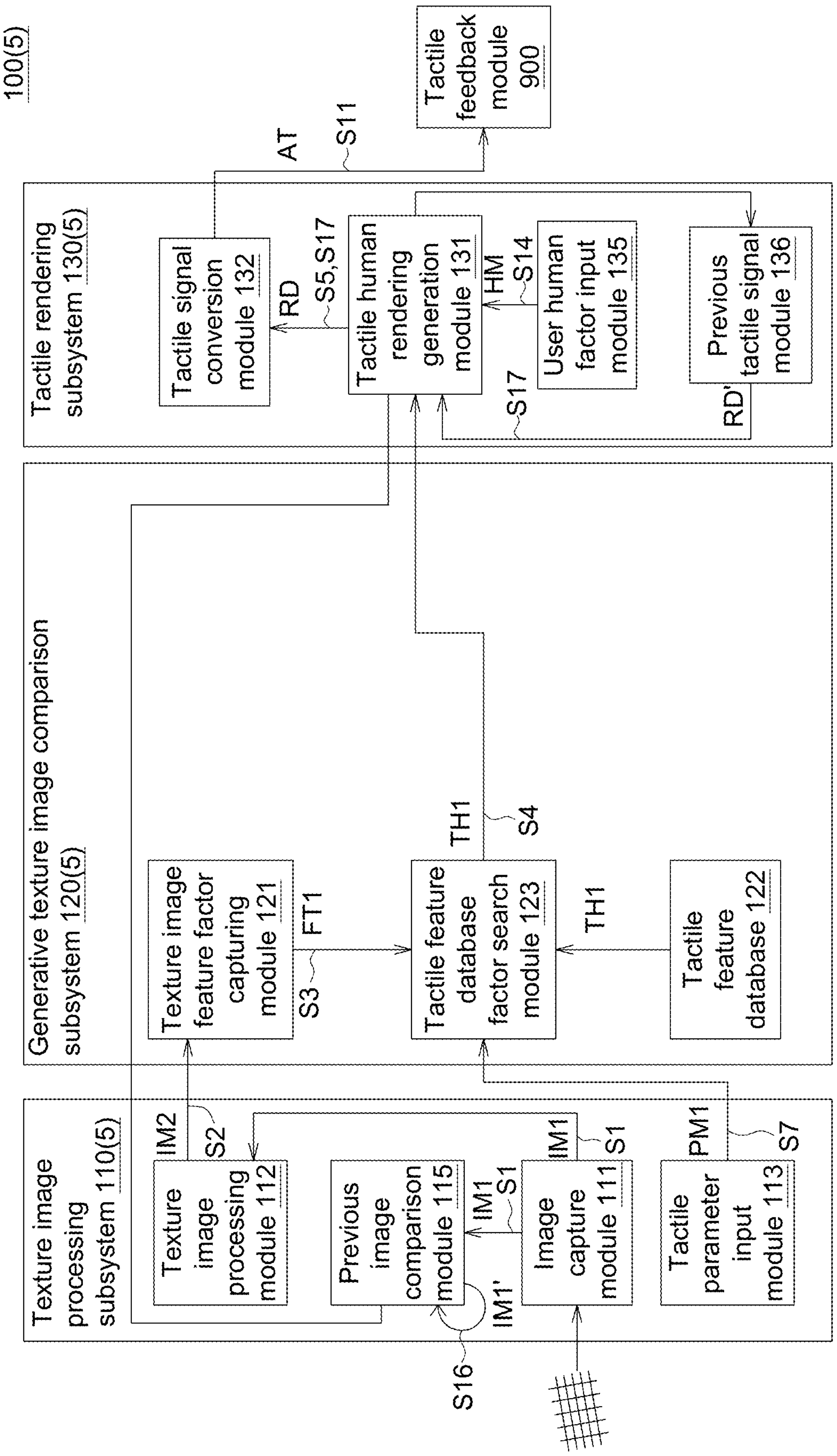
FIG. 7 illustrates a block diagram of a tactile rendering system and a flowchart of a tactile rendering method according to another embodiment of the present disclosure.

Please refer to FIG. 7, which illustrates a block diagram of a tactile rendering system 100(5) and a flowchart of a tactile rendering method according to another embodiment of the present disclosure. The tactile rendering system 100(5) in FIG. 7 includes a texture image processing subsystem 110(5), a generative texture image comparison subsystem 120(5) and a tactile rendering subsystem 130(5). The texture image processing subsystem 110(5) further includes a previous image comparison module 115. The tactile rendering subsystem 130(5) further includes a previous tactile signal module 136. The previous image comparison module 115 and/or the previous tactile signal module 136 is, for example, but not limited to, a circuit, a circuit board, a storage device storing program code, or a chip.

In step S16, the previous image comparison module 115 compares the real material surface image IM1 with a previous real material surface image IM1'.

In step S17, if the difference between the real material surface image IM1 and the previous real material surface image IM1' is lower than a predetermined value (for example, but not limited to, 20%), the previous tactile signal module 136 provides the previous tactile rendering signal RD', such that the tactile human rendering generation module 131 adjusts the previous tactile rendering signal RD' according to the difference between the real material surface image IM1 and the previous real material surface image IM1' to obtain the current tactile rendering signal RD2.

The previous real material surface image IM1' is further considered, so the subsequent tactile rendering signal RD could be obtained directly according to the adjustment of the previous tactile rendering signal RD', such as adjusting the actuation control signal intensity.

According to the above embodiment in FIG. 7, through the comparison of the real material surface image IM1 and the previous real material surface image IM1', the tactile rendering signal RD could be obtained, making the simulated tactile close to real-time.

Figure 8:
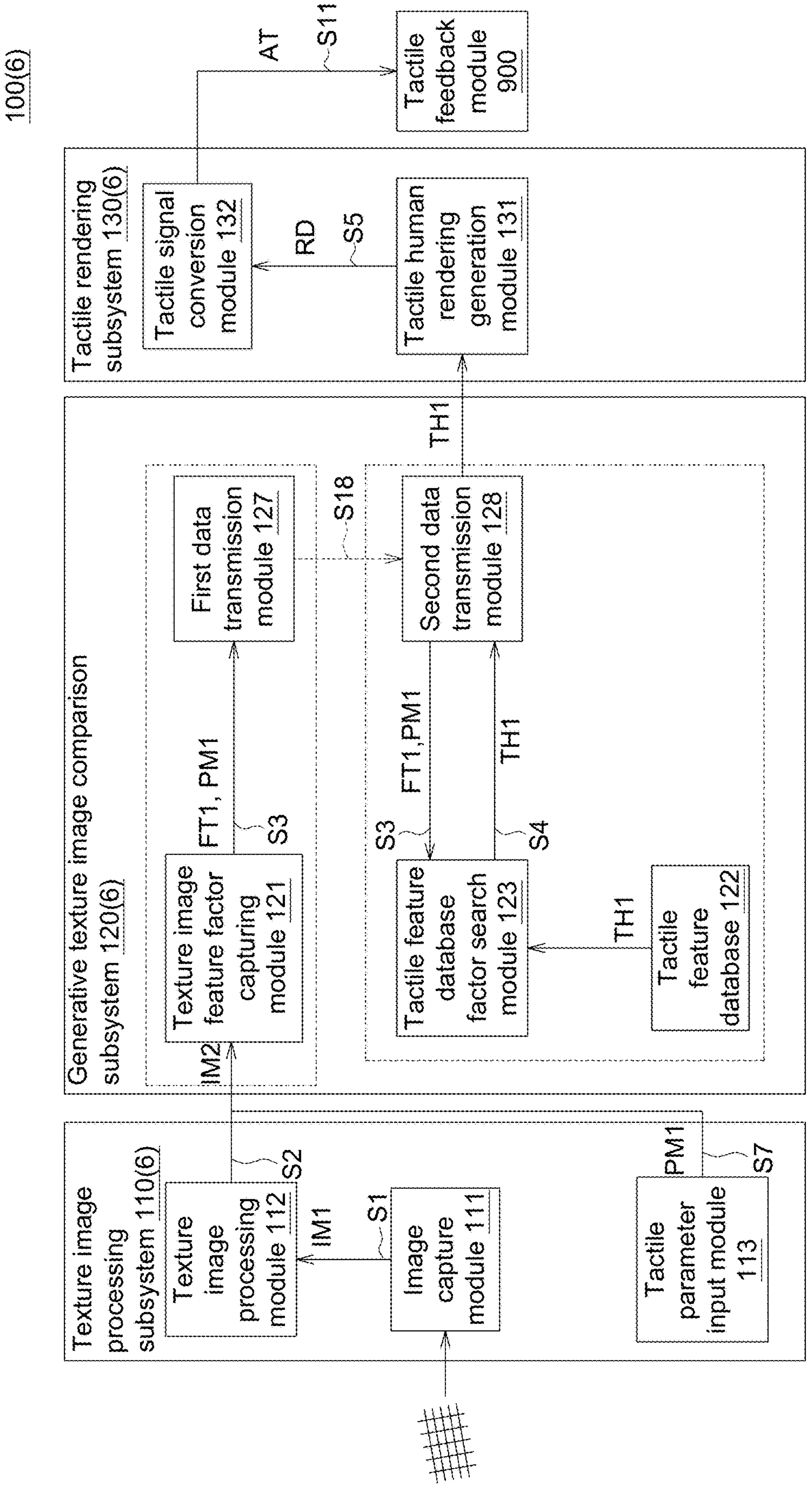
FIG. 8 illustrates a block diagram of a tactile rendering system and a flowchart of a tactile rendering method according to another embodiment of the present disclosure.

Please refer to FIG. 8, which illustrates a block diagram of a tactile rendering system 100(6) and a flowchart of a tactile rendering method according to another embodiment of the present disclosure. The tactile rendering system 100(6) in FIG. 8 includes a texture image processing subsystem 110(6), a generative texture image comparison subsystem 120(6) and a tactile rendering subsystem 130(6). The generative texture image comparison subsystem 120(6) further includes a first data transmission module 127 and a second data transmission module 128. The first data transmission module 127 and/or the second data transmission module 128 are, for example, but not limited to, a wireless network transmission module, a mobile communication transmission module, and a wired network and wireless network hybrid module.

In step S18, the first data transmission module 127 transmits the real texture image feature factor FT1 to a remote site, and the second data transmission module 128 receives the real texture image feature factor FT1 at the remote site. The tactile feature database 122 and the tactile feature database factor search module 123 are located at the remote site, so that the computing resources at the remote site could be used to perform fast searches.

According to the embodiment of FIG. 8 above, the search speed is further accelerated through remote computing technology to achieve real-time accurate tactile rendering output.

Figure 9:
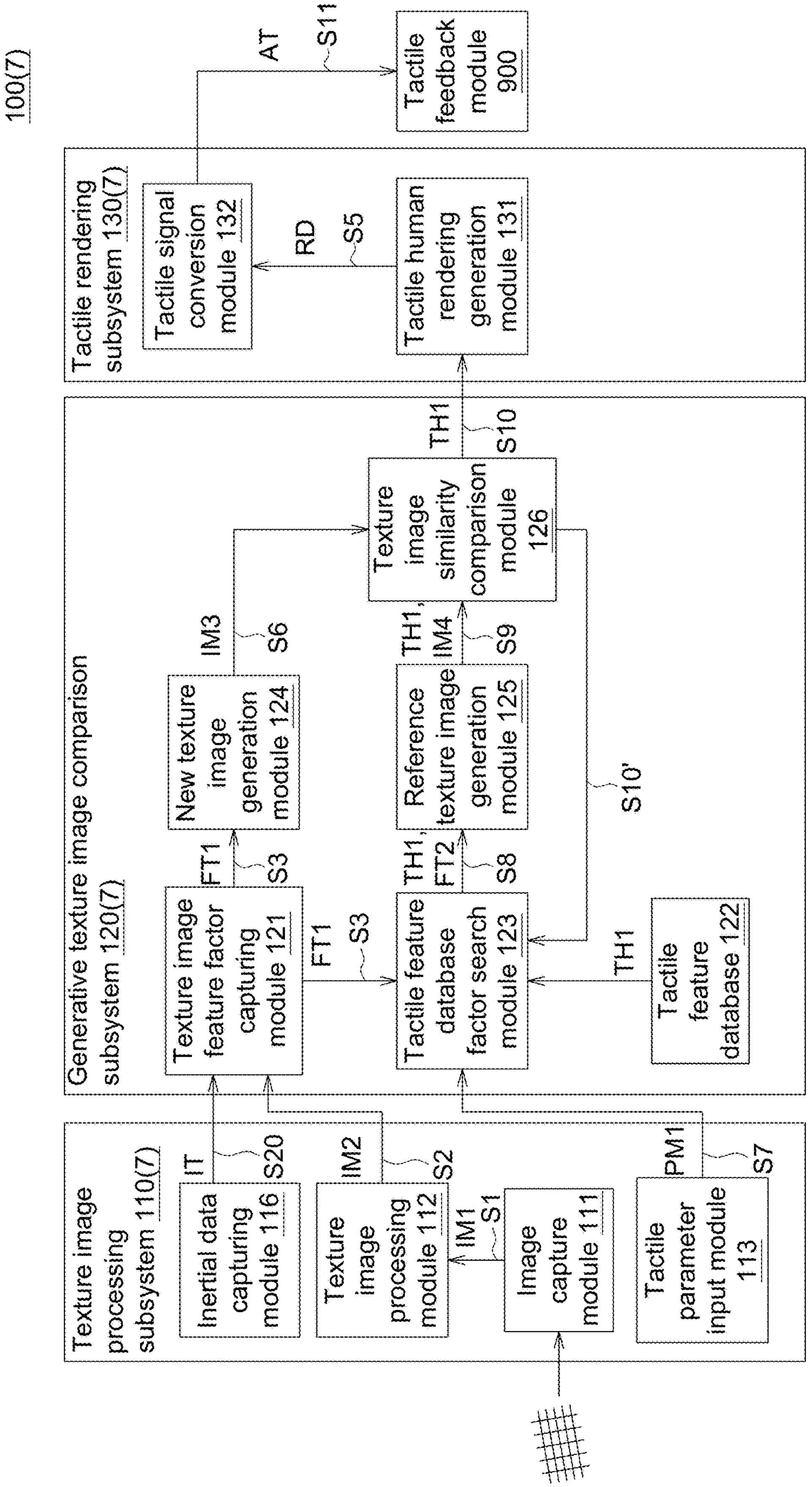
FIG. 9 illustrates a block diagram of a tactile rendering system and a flowchart of a tactile rendering method according to another embodiment of the present disclosure.

Please refer to FIG. 9, which illustrates a block diagram of a tactile rendering system 100(7) and a flowchart of a tactile rendering method according to another embodiment of the present disclosure. The tactile rendering system 100(7) in FIG. 9 includes a texture image processing subsystem 110(7), a generative texture image comparison subsystem 120(7) and a tactile rendering subsystem 130(7). The texture image processing subsystem 110(7) further includes an inertial data capturing module 116. The inertial data capturing module 116 is, for example, but not limited to, a gyroscope or an accelerometer.

In step S20, the inertial data capturing module 116 captures an inertia data IT. The inertia data IT is, for example but not limited to, an acceleration or an azimuth angle.

In step S3, the texture image feature factor capturing module 121 obtains the real texture image feature factor FT1 according to the real texture image IM2 and the inertia data IT.

According to the embodiment in FIG. 9 above, with the assistance of inertia data IT, a more accurate real texture image feature factor FT1 could be obtained, making the simulated tactile sensation generated by the actuation signals AT more realistic.

Figure 10:
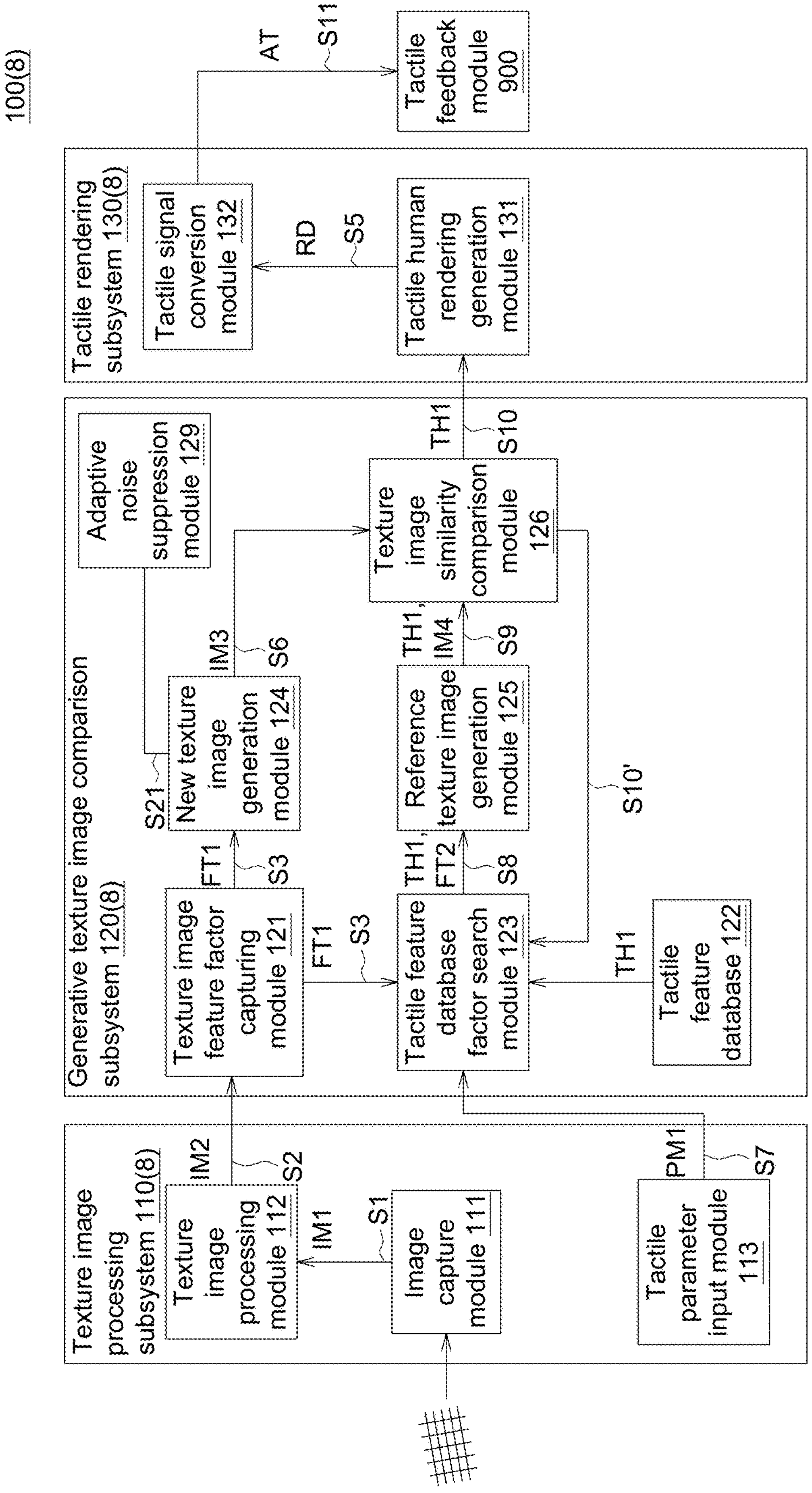
FIG. 10 illustrates a block diagram of a tactile rendering system and a flowchart of a tactile rendering method according to another embodiment of the present disclosure.

Please refer to FIG. 10, which illustrates a block diagram of a tactile rendering system 100(8) and a flowchart of a tactile rendering method according to another embodiment of the present disclosure. The tactile rendering system 100(8) in FIG. 10 includes a texture image processing subsystem 110(8), a generative texture image comparison subsystem 120(8) and a tactile rendering subsystem 130(8). The generative texture image comparison subsystem 120(8) further includes an adaptive noise suppression module 129. The adaptive noise suppression module 129 is, for example, but not limited to, a circuit, a circuit board, a storage device storing program code, or a chip.

In step S21, the adaptive noise suppression module 129 filters out the noise of the real texture image IM2. The adaptive noise suppression module 129 uses, for example, but not limited to, the minimum mean square error filtering or an autoregressive model to filter out the noise of the real texture image IM2.

According to the above embodiment in FIG. 10, the noise of the real texture image IM2 could be filtered out, making the simulated tactile sensation generated by the activation signal AT more realistic.

Figure 11:
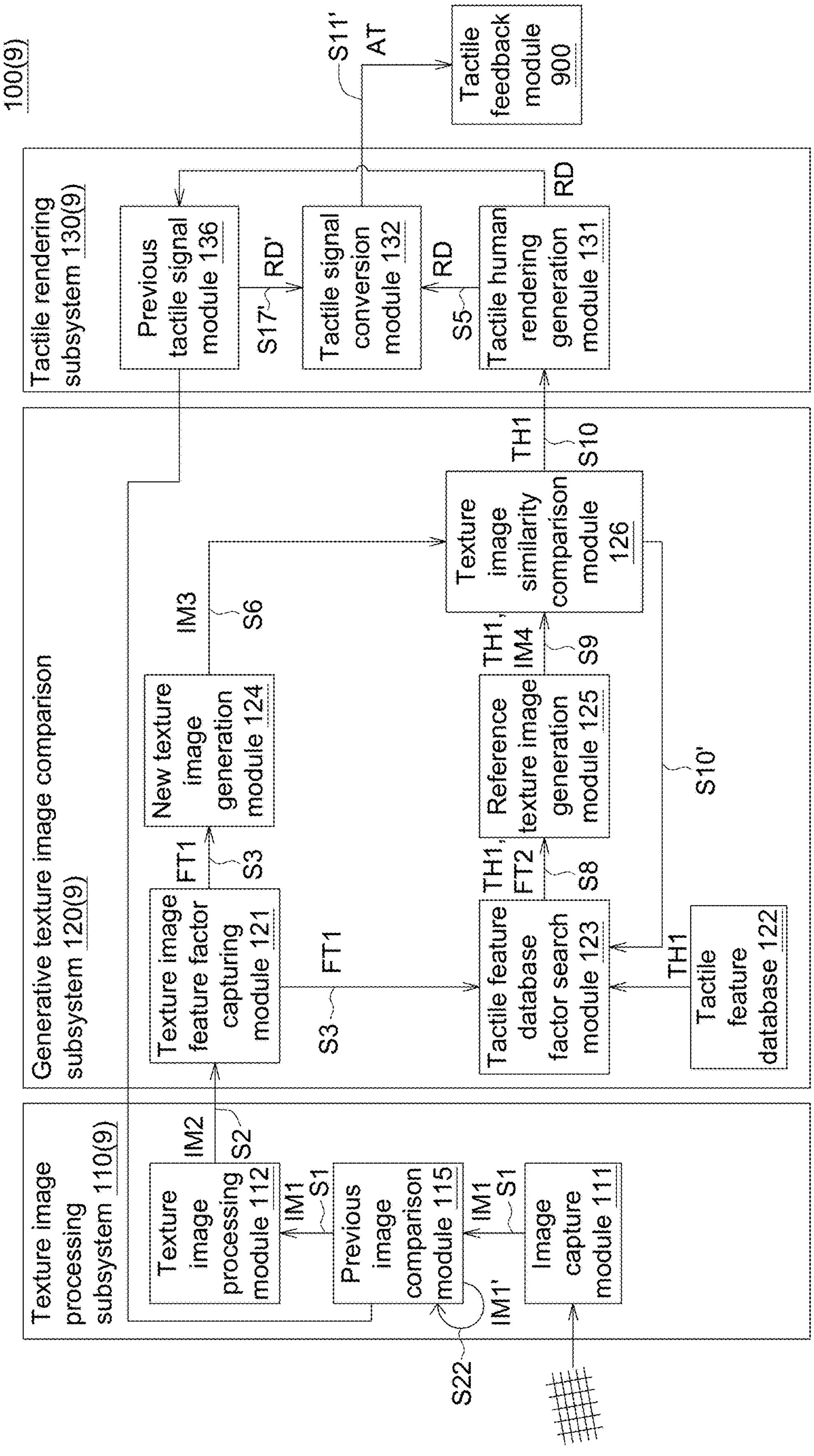
FIG. 11 illustrates a block diagram of a tactile rendering system and a flowchart of a tactile rendering method according to another embodiment of the present disclosure.

Please refer to FIG. 11, which illustrates a block diagram of a tactile rendering system 100(9) and a flowchart of a tactile rendering method according to another embodiment of the present disclosure. The tactile rendering system 100(9) in FIG. 11 includes a texture image processing subsystem 110(9), a generative texture image comparison subsystem 120(9) and a tactile rendering subsystem 130(9). The texture image processing subsystem 110(9) further includes a previous image comparison module 115. The tactile rendering subsystem 130(9) further includes a previous tactile signal module 136. The previous image comparison module 115 and/or the previous tactile signal module 136 is, for example, but not limited to, a circuit, a circuit board, a storage device storing program code, or a chip.

In step S22, the previous image comparison module 115 compares the real material surface image IM1 with a previous real material surface image IM1'.

In step S17', if the similarity between the real material surface image IM1 and the previous real material surface image IM1' is higher than a predetermined value (such as, but not limited to, 90%), the previous tactile signal module 136 provides the previous tactile rendering signal RD'.

Then, in step S11', the tactile signal conversion module 132 converts the tactile rendering signal RD or the previous tactile rendering signal RD' into at least one actuation signal AT. That is to say, when the similarity between real material surface image IM1 and previous real material surface image IM1' is higher than the predetermined value of 90%, extraction of the real texture image feature factor FT1, search for the reference texture image feature factor FT2, generation and comparison of the new texture image IM3 and the reference texture image IM4, search for the tactile data TH1, and generation of the tactile rendering signal RD are not required.

According to the above embodiment in FIG. 11, by comparing the real material surface image IM1 with the previous real material surface image IM1', the calculation and processing procedure could be skipped, and the processing speed could be accelerated.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations could be made to the disclosed embodiments. It is intended that the specification and examples be considered as exemplars only, with a true scope of the disclosure being indicated by the following claims and their equivalents.

What is claimed is:

1. A tactile rendering system, comprising:
- a texture image processing subsystem, including:
  - an image capture module, used to obtain a real material surface image; and
  - a texture image processing module, used to obtain a real texture image according to the real material surface image;
- a generative texture image comparison subsystem, including:
  - a texture image feature factor capturing module, used to analyze at least one real texture image feature factor according to the real texture image;
  - a tactile feature database;
  - a tactile feature database factor search module, used to search the tactile feature database to obtain at least one tactile data according to the at least one real texture image feature factor, wherein the at least one tactile data includes a quantification result of image pattern, and the quantification result of the image pattern includes a gray-scale co-occurrence matrix energy value, an entropy value, a contrast value, or a contrast difference value; and
  - a texture image similarity comparison module, used to compare a new texture image which is generated according to the at least one real texture image feature factor and a reference texture image which is generated according to at least one reference texture image feature factor, wherein if a similarity between the new texture image and the reference texture image is greater than a predetermined value, the at least one tactile data corresponding to the at least one reference texture image feature factor is outputted; and
- a tactile rendering subsystem, including:
  - a tactile human rendering generation module, used to generate at least one tactile rendering signal according to the at least one tactile data.

2. The tactile rendering system according to claim 1, wherein
- the texture image processing subsystem further includes:
  - a tactile parameter input module, used to input at least one material surface property parameter, wherein the tactile feature database factor search module obtains the at least one reference texture image feature factor according to the at least one material surface property parameter and the at least one real texture image feature factor;
- the generative texture image comparison subsystem further includes:
  - a new texture image generation module, used to generate the new texture image according to the at least one real texture image feature factor; and
  - a reference texture image generation module, used to generate the reference texture image according to the at least one reference texture image feature factor.

3. The tactile rendering system according to claim 1, wherein the tactile rendering subsystem further includes:
- a tactile signal conversion module, used to convert the at least one tactile rendering signal to at least one actuation signal.

4. The tactile rendering system according to claim 3, wherein a quantity of the at least one actuation signal comprises a plurality of actuation signals, and the plurality of actuation signals are used to control at least one tactile feedback module in a multiple access manner.

5. The tactile rendering system according to claim 3, wherein a quantity of the at least one actuation signal comprises a plurality of actuation signals, and the plurality of actuation signals are used to control at least one tactile feedback module in a spatial separation manner.

6. The tactile rendering system according to claim 1, wherein the tactile rendering subsystem further includes:
- a user posture tracking module, used to obtain a user posture; and
- a displacement information analysis module, used to analyze a displacement information according to the user posture;
- wherein the tactile human rendering generation module generates the at least one tactile rendering signal further according to the displacement information.

7. The tactile rendering system according to claim 1, wherein the tactile rendering subsystem further includes:
- a user human factor input module, used to input a user human factor;
- wherein the tactile human rendering generation module optimizes the at least one tactile rendering signal according to the user human factor.

8. The tactile rendering system according to claim 1, wherein the texture image processing subsystem further includes:

a virtual object selection module, used to obtain at least one virtual object, wherein the texture image processing module obtains the real texture image according to the real material surface image and the at least one virtual object.

9. The tactile rendering system according to claim 1, wherein the texture image processing subsystem further includes:

a previous image comparison module, used to compare the real material surface image and a previous real material surface image;

the tactile rendering subsystem further includes:

a previous tactile signal module, wherein if a difference between the real material surface image and the previous real material surface image is lower than a predetermined value, the previous tactile signal module provides at least one previous tactile rendering signal; the tactile human rendering generation module adjusts the at least one previous tactile rendering signal according to a difference between the real material surface image and the at least one previous tactile rendering signal to obtain the at least one tactile rendering signal.

10. The tactile rendering system according to claim 1, wherein the texture image processing subsystem further includes:

an inertial data capturing module, used to capture inertia data, wherein the texture image feature factor capturing module analyzes the at least one real texture image feature factor according to the real texture image and the inertia data.

11. The tactile rendering system according to claim 1, wherein the texture image processing subsystem further includes:

a previous image comparison module, used to compare the real material surface image and a previous real material surface image;

the tactile rendering subsystem further includes:

a previous tactile signal module, wherein if a similarity between the real material surface image and the previous real material surface image is higher than a predetermined value, the previous tactile signal module provides at least one previous tactile rendering signal; and a tactile signal conversion module, used to convert the at least one tactile rendering signal or the at least one previous tactile rendering signal to at least one actuation signal.

12. A tactile rendering method, comprising:

obtaining a real material surface image;

obtaining a real texture image according to the real material surface image;

obtaining at least one real texture image feature factor according to the real texture image;

searching a tactile feature database according to the at least one real texture image feature factor, to obtain at least one tactile data, wherein the at least one tactile data includes a quantification result of image pattern, and the quantification result of the image pattern includes a gray-scale co-occurrence matrix energy value, an entropy value, a contrast value, or a contrast difference value;

comparing a new texture image which is generated according to the at least one real texture image feature factor and a reference texture image which is generated according to at least one reference texture image feature factor, wherein if a similarity between the new texture image and the reference texture image is greater than a predetermined value, the at least one tactile data corresponding to the at least one reference texture image feature factor is outputted; and generating at least one tactile rendering signal according to the at least one tactile data.

13. The tactile rendering method according to claim 12, further comprising:

generating the new texture image according to the at least one real texture image feature factor;

inputting at least one material surface property parameter;

obtaining the at least one reference texture image feature factor according to the at least one material surface property parameter and the at least one real texture image feature factor;

generating the reference texture image according to the at least one reference texture image feature factor.

14. The tactile rendering method according to claim 12, further comprising:

converting the at least one tactile rendering signal into at least one actuation signal.

15. The tactile rendering method according to claim 12, further comprising:

obtaining a user posture; and obtaining a displacement information according to the user posture, and optimizing the at least one tactile rendering signal according to the displacement information.

16. The tactile rendering method according to claim 12, further comprising:

optimizing the at least one tactile rendering signal according to a user human factor.

17. The tactile rendering method according to claim 12, further comprising:

providing at least one virtual object, and optimizing the real texture image according to the at least one virtual object.

18. The tactile rendering method according to claim 12, further comprising:

comparing the real material surface image with a previous real material surface image;

adjusting at least one previous tactile rendering signal to obtain the at least one tactile rendering signal, if a difference between the real material surface image and the previous real material surface image is lower than a predetermined value.

19. The tactile rendering method according to claim 12, further comprising:

capturing an inertia data, wherein the at least one real texture image feature factor is obtained according to the real texture image and the inertia data.

20. The tactile rendering method according to claim 12, further comprising:

comparing the real material surface image with a previous real material surface image;

providing at least one previous tactile rendering signal, if a similarity between the real material surface image and the previous real material surface image is higher than a predetermined value; and converting the at least one tactile rendering signal or the at least one previous tactile rendering signal into at least one actuation signal.

* * * * *